US010605579B2

(12) United States Patent
McKinster

(10) Patent No.: US 10,605,579 B2
(45) Date of Patent: Mar. 31, 2020

(54) TAPE MEASURE WITH MOTOR SPRING RETRACTION SYSTEM

(71) Applicant: Milwaukee Electric Tool Corporation, Brookfield, WI (US)

(72) Inventor: Scott Earl McKinster, Watertown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 15/902,711

(22) Filed: Feb. 22, 2018

(65) Prior Publication Data
US 2018/0245903 A1 Aug. 30, 2018

Related U.S. Application Data

(60) Provisional application No. 62/478,433, filed on Mar. 29, 2017, provisional application No. 62/463,456, filed on Feb. 24, 2017.

(51) Int. Cl.
*G01B 3/10* (2020.01)
*G01B 3/1005* (2020.01)

(52) U.S. Cl.
CPC ...... *G01B 3/1005* (2013.01); *G01B 2003/103* (2013.01); *G01B 2003/1043* (2013.01)

(58) Field of Classification Search
CPC .. G01B 3/10; G01B 3/1002; G01B 2003/101; G01B 3/1005; G01B 2003/1023; G01B 2003/103; G01B 2003/1025; G01B 2003/1028; G01B 2003/1038
See application file for complete search history.

(56) References Cited

U.S. PATENT DOCUMENTS

| 2,543,176 | A | | 2/1951 | Komassa | |
|---|---|---|---|---|---|
| 2,833,534 | A | | 5/1958 | Foster | |
| 2,869,801 | A | | 1/1959 | Foster | |
| 2,997,251 | A | * | 8/1961 | Chafin | G01B 3/1005 242/372 |
| 3,033,316 | A | | 5/1962 | Foster | |
| 3,705,962 | A | * | 12/1972 | Banister | H02G 11/02 191/12.4 |
| 4,057,904 | A | * | 11/1977 | Vrabel | G01B 3/11 33/700 |
| 4,171,109 | A | * | 10/1979 | Roe | B65H 75/486 242/375 |
| 4,207,770 | A | * | 6/1980 | Grushow | G01P 13/00 200/61.39 |
| 4,352,244 | A | | 10/1982 | Tomuro | |

(Continued)

FOREIGN PATENT DOCUMENTS

GB 894505 4/1962

*Primary Examiner* — Lisa M Caputo
*Assistant Examiner* — Tran M. Tran
(74) *Attorney, Agent, or Firm* — Reinhart Boerner Van Deuren s.c.

(57) ABSTRACT

A tool, such as a tape measure, including a spring-based retraction system is shown. The spring-based retraction system includes a motor spring system that drives a tape reel during tape retraction. The output drum of the motor spring system is coupled to the tape reel such that rotation of the reel causes rotation of the output drum. The output drum is located adjacent to the tape reel, and the output drum and tape reel may have a common axis of rotation.

20 Claims, 8 Drawing Sheets

(56) References Cited

U.S. PATENT DOCUMENTS

| | | | |
|---|---|---|---|
| 4,506,446 A | | 3/1985 | Mitchell |
| 4,527,334 A | * | 7/1985 | Jones .................. G01B 3/1005 242/373 |
| 4,756,087 A | * | 7/1988 | Sing ..................... G01B 3/1005 242/384.7 |
| 5,094,396 A | * | 3/1992 | Burke .................. B65H 75/44 242/375 |
| 5,119,521 A | * | 6/1992 | Clontz ................... B25D 1/00 33/760 |
| 6,308,432 B1 | * | 10/2001 | Gilliam ............... G01B 3/1005 33/767 |
| 6,349,482 B1 | * | 2/2002 | Gilliam ............... G01B 3/1005 33/755 |
| 6,643,948 B1 | * | 11/2003 | Seymour ............. G01B 3/1005 33/767 |
| 6,715,214 B1 | | 4/2004 | Lin |
| 6,874,722 B2 | * | 4/2005 | Wei ..................... B65H 75/368 191/12.2 R |
| 6,964,114 B1 | * | 11/2005 | Chen ................... G01B 3/1005 242/371 |
| 7,024,790 B1 | | 1/2006 | Qilian |
| 7,003,895 B2 | * | 2/2006 | Harris ................. G01B 3/1005 242/378 |
| 7,360,320 B2 | | 4/2008 | Kelley |
| 7,458,536 B2 | * | 12/2008 | Hui ....................... B65H 75/48 242/375.3 |
| 7,559,154 B2 | | 7/2009 | Levine et al. |
| 8,863,399 B2 | * | 10/2014 | Steele ................. G01B 3/1082 33/679.1 |
| 9,719,764 B2 | * | 8/2017 | Chiu ................... G01B 3/1084 |
| 2007/0101599 A1 | | 5/2007 | Levine et al. |

\* cited by examiner

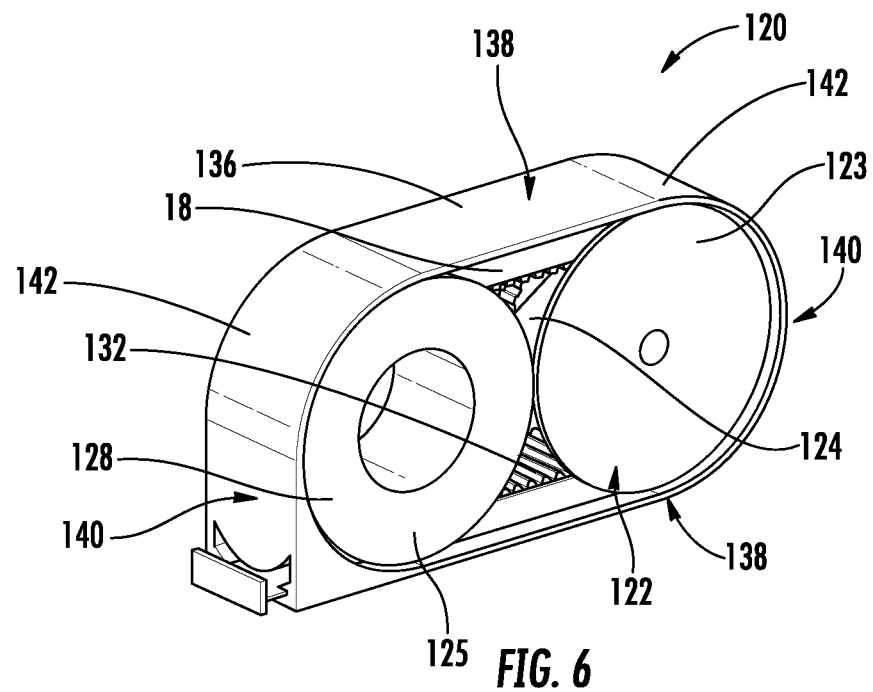

TAPE MEASURE WITH MOTOR SPRING RETRACTION SYSTEM

CROSS-REFERENCE TO RELATED PATENT APPLICATIONS

The present application claims the benefit of and priority to U.S. Provisional Application No. 62/463,456, filed on Feb. 24, 2017, and to U.S. Provisional Application No. 62/478,433, filed on Mar. 29, 2017, which are incorporated herein by reference in their entireties.

BACKGROUND OF THE INVENTION

The present invention relates generally to the field of tools. The present invention relates specifically to a tape measure, measuring tape, retractable rule, etc., that includes a spring-based retraction system having a motor spring arrangement driving tape retraction.

Tape measures are measurement tools used for a variety of measurement applications, including in the building and construction trades. Some tape measures include a graduated, marked blade wound on a reel and also include a retraction system for automatically retracting the blade onto the reel. In some typical tape measure designs, the retraction system is driven by a coil or spiral spring that is tensioned, storing energy as the tape is extended and releasing energy to spin the reel, winding the blade back onto the reel.

SUMMARY OF THE INVENTION

One embodiment of the invention relates to a tape measure with a spring-based retraction system, a tape reel and a tape blade wound around the tape reel. The spring-based retraction system includes a storage drum, a coil spring and an output drum. The output drum is rotatably coupled to a tape reel such that the output drum rotates within the housing, and the output drum is located adjacent to the tape reel in a direction along an axis of rotation of the tape reel. The spring is unwound from the storage drum and wound around the output drum when the tape blade is extended from the housing, storing energy within the spring. The spring releases energy driving retraction of the tape blade into a wound position on the reel.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

FIG. 6 shows a tape measure including a motor-spring tape retraction system, according to another exemplary embodiment.

FIG. 7 shows a perspective view of the inside of the tape measure of FIG. 6 with a portion of the housing removed, according to an exemplary embodiment.

DETAILED DESCRIPTION

Referring generally to the figures, various embodiments of a tape measure are shown. Various embodiments of the tape measure discussed herein include an innovative retraction system including a motor spring-based tape retraction system designed to provide for a variety of desired retraction characteristics, including decreased tape retraction speeds and tape acceleration, while at the same time providing compact, easy-to-handle tape housing.

Some tape measure blades are susceptible to damage/breakage due to high speed during retraction. For example, high speeds during retraction may cause the tape blade to whip (e.g., the tendency of the tape measure blade to bend or snap back on itself during fast retraction) which can crack or tear the tape blade, and similarly, high retraction speeds can damage the tape blade when the tape hook contacts the tape housing at the end of retraction.

As will generally be understood, in certain tape measure designs, a spring stores energy during tape blade extension and applies a force/torque to a reel causing the tape blade to wind on to the reel during tape blade retraction. Various aspects of spring design, such as spring energy, torque profile, spring constant, etc., are selected to ensure that operation of the spring has enough energy to provide satisfactory tape retraction. However, because of the spring physics and characteristics, the typical tape measure spiral spring (e.g., a power spring) delivers excess energy to the tape blade during retraction in order to ensure full tape retraction at a satisfactory speed, and this excess energy translates into undesirably highly retraction speeds and whip, particularly toward the end of retraction. As will be discussed in more detail below, the spring arrangement (typically referred to as a motor spring) of the tape measure retraction system of the present application delivers enough torque to the tape blade/reel to provide sufficient retraction speed acceleration, but also has a flat, relatively low maximum torque profile, which limits the maximum retraction speed and acceleration that the tape blade experiences. In addition, the motor spring arrangement as discussed herein is arranged and positioned in an inventive manner that Applicant believes delivers both torque as needed for tape retraction while also allowing for a compact measuring tape.

Figure 1:
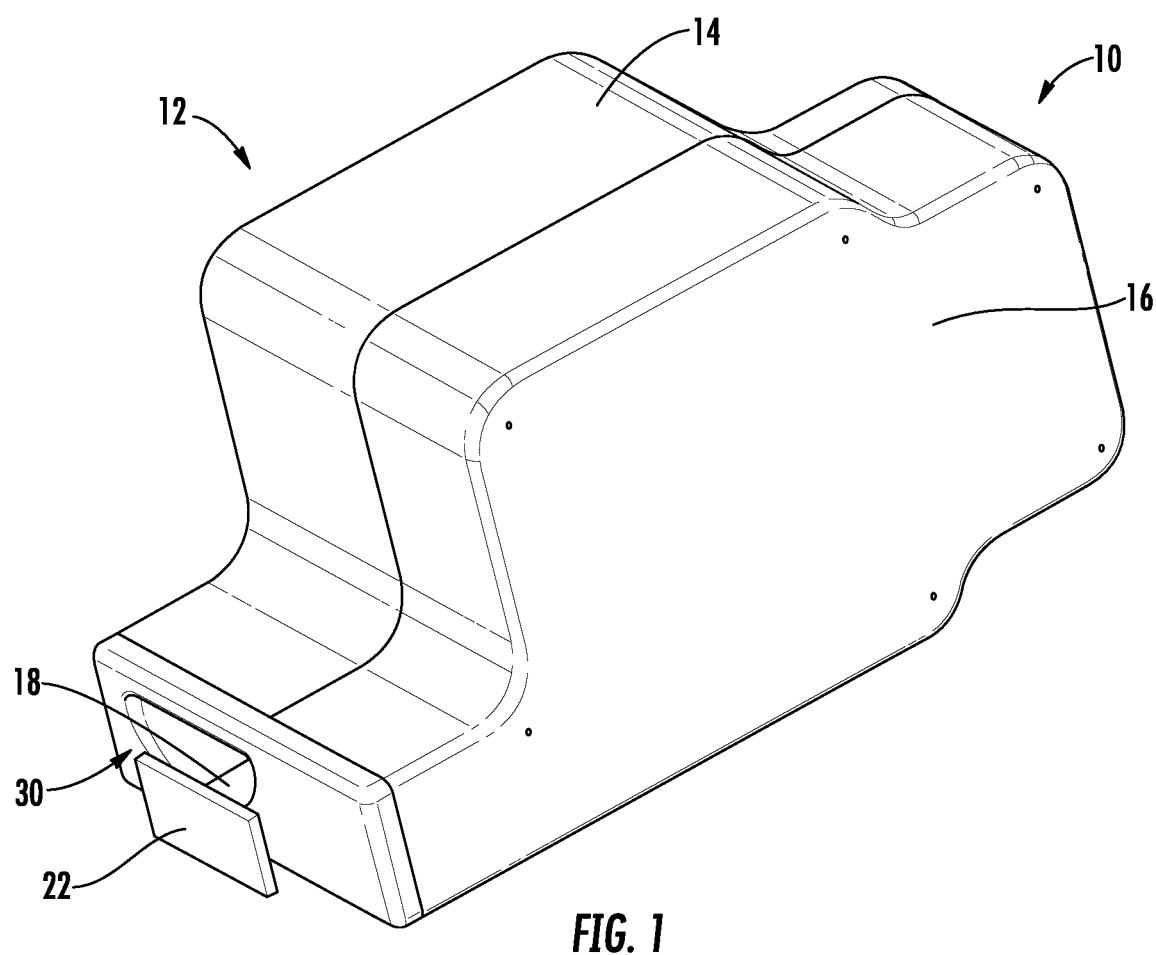
FIG. 1 is a perspective view of a tape measure including a motor-spring tape retraction system, according to an exemplary embodiment.
Figure 2:
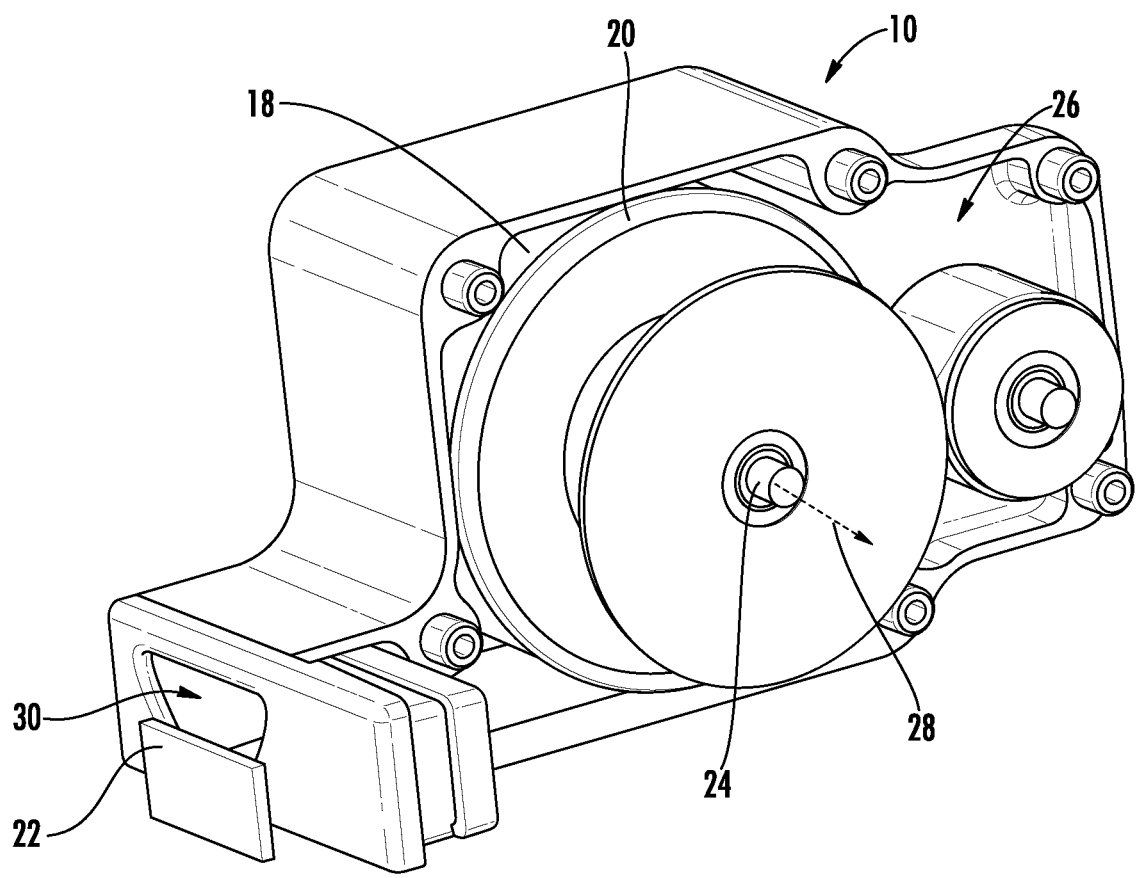
FIG. 2 is a perspective view of the tape measure of FIG. 1 with a first portion of the housing removed, according to an exemplary embodiment.

Referring to FIGS. 1 and 2, a length measurement device, tape measure, measuring tape, retractable rule, etc., such as tape measure 10, is shown according to an exemplary embodiment. In general, tape measure 10 includes a housing 12 having a first part 14 and a second part 16. Tape measure 10 includes a tape blade 18 and, in the retracted position shown in FIGS. 1 and 2, tape blade 18 is wound or coiled onto a tape reel 20.

In general, tape blade 18 is an elongated strip of material including a plurality of graduated measurement markings, and in specific embodiments, tape blade 18 is an elongated strip of metal material (e.g., steel material) that includes an outer most end coupled to a hook assembly 22. Tape blade 18 may include various coatings (e.g., polymer coating layers) to help protect tape blade 18 and/or the graduated markings of the blade from wear, breakage, etc. In a specific embodiment, tape blade 18 is a steel tape having a length of 8 m, a width of 30 mm and thickness of 0.4 mm.

Referring to FIG. 2, tape reel 20 is rotatably mounted to an axle or post 24 that is supported from housing 12. In one embodiment, post 24 is rigidly connected (e.g., rotationally fixed) relative to housing 12, and in another embodiment, post 24 is rotatably connected to housing 12 such that post 24 is allowed to rotate relative to housing 12 during tape extension or retraction.

Tape measure 10 includes a retraction system or mechanism, shown as motor spring system 26. As will be discussed in more detail below, motor spring system 26 is coupled to tape reel 20 such that the spring of motor spring system 26 is coiled or wound to store energy during extension of tape 18 from housing 12 and is unwound, releasing energy, driving rewinding of tape 18 onto tape reel 20 during retraction of tape 18 (e.g., following release or unlocking of the tape 18).

Figure 3:
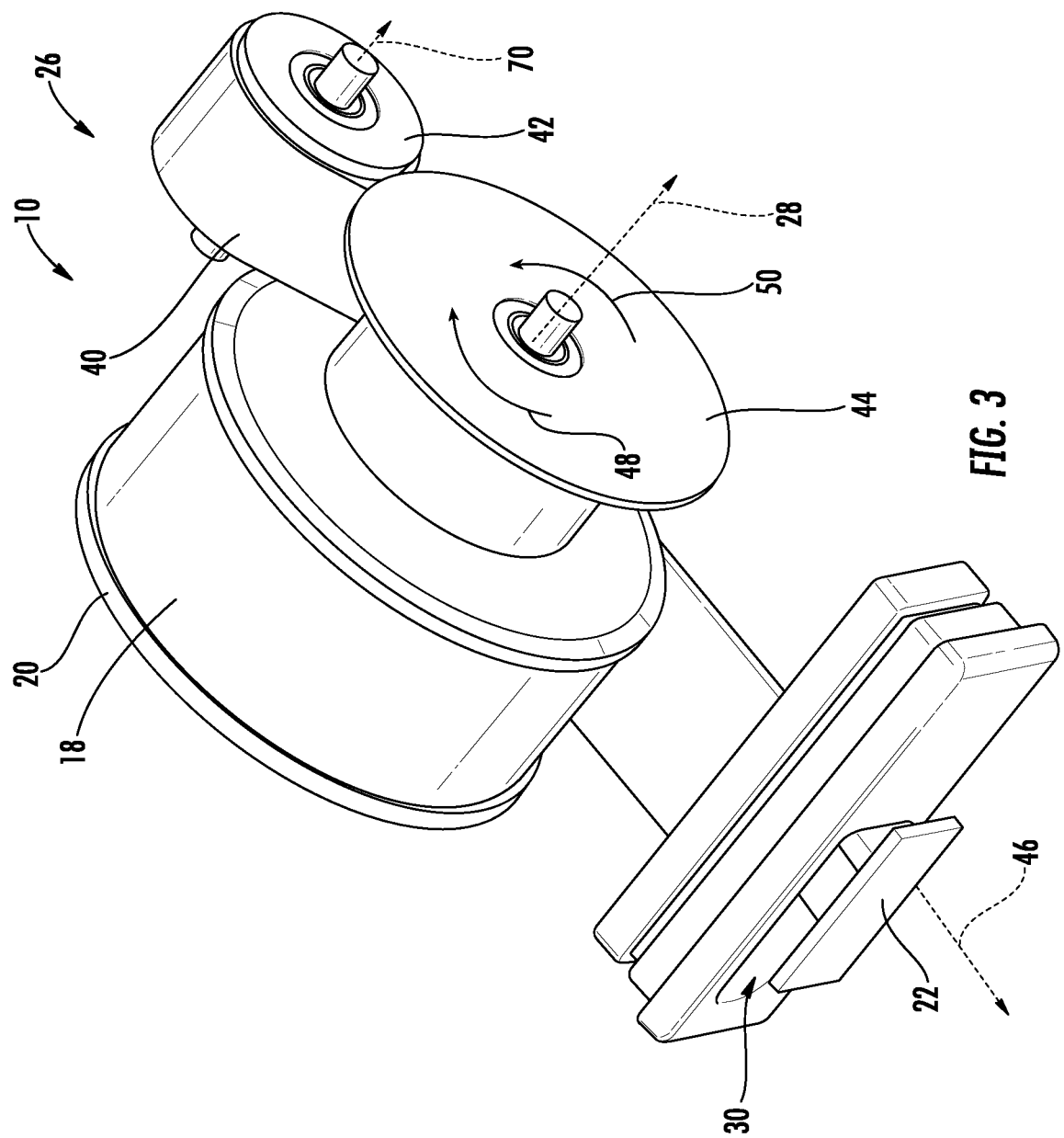
FIG. 3 is a perspective view of the tape measure of FIG. 1 with first and second portions of the housing removed, according to an exemplary embodiment.

As shown in FIGS. 2 and 3, the non-extended portion of tape 18 is wound onto a reel 20, which is surrounded by housing 12. Reel 20 is rotatably disposed about an axis 28 of tape measure 10, and spring of motor spring system 26 is rigidly coupled to reel 20 and configured to drive reel 20 about rotation axis 28, which in turn provides powered retraction of tape blade 18. In various embodiments, tape measure 10 may include a tape lock that selectively engages tape blade 18, which acts to hold tape blade 18 and reel 20 in place such that an extended segment of tape blade 18 remains at a desired length. Tape measure 10 includes a tape port 30 located in tape housing 12. In one embodiment, tape port 30 has an arcuate shape, corresponding to an arcuate cross-sectional profile of tape blade 18. Tape port 30 is an opening through housing 12 that allows for the retraction and extension of tape blade 18 into and from housing 12 during tape extension and retraction.

Referring to FIG. 3, motor spring system 26 includes a coil spring 40, a storage reel or drum 42 and an output reel or drum 44. Coil spring 40 has a first end coupled to storage drum 42 and a second end coupled to output drum 44. As will be explained in more detail below, in general, motor spring system 26 is an elongated spring of metal material that is wound in a coiled arrangement on storage drum 42 when tape blade 18 is in the retracted position wound around reel 20, and that is wound in the opposite direction onto output drum 44 when tape blade 18 is extended from tape housing 12. The diameter of output drum 44 is greater than the free coil diameter of coil spring 40 such that spring 40 is in the stressed configuration when wrapped around output drum 44. Output drum 44 is rigidly connected to reel 20 such that output drum 44 rotates with reel 20 during tape extension and retraction.

When tape blade 18 is extended/pulled from tape housing 12 in the direction of arrow 46, reel 20 rotates in the direction of arrow 48, paying off tape 18 from reel 20. Rotation of reel 20 in the direction of arrow 48 causes rotation of output drum 44, which causes spring 40 to be unwound from storage drum 42 and wound upon output drum 44. Spring 40, when wound upon output drum 44, is in an energy storing state.

When tape blade 18 is released, spring 40 releases energy winding back onto storage drum 42, which drives output drum 44 in the direction of arrow 50. As output drum 44 rotates in the direction of arrow 50, reel 20 also rotates in the direction of arrow 50 causing tape 18 to rewind back onto reel 20. In the specific embodiment shown in FIG. 3, motor spring system 26 is arranged such that spring 40 is wound in opposite directions on drums 42 and 44. In this arrangement, during tape extension, storage drum 42 rotates in a direction opposite of arrow 48, and during tape retraction, storage drum 42 rotates in a direction opposite of arrow 50. While motor spring system 26 can be arranged such that both drums 42 and 44 rotate in the same direction during tape extension and retraction, the opposite wind arrangement shown in FIG. 3 results in a higher spring torque, which may allow for retraction of a longer or thicker tape blade 18.

While FIG. 3 shows motor spring system 26 including a single spring set (e.g., a storage drum, an associated output drum and an associated spring), in other embodiments, motor spring system 26 may include two or more motor spring sets. In one such embodiment, motor spring system 26 includes a pair of spring sets positioned on either side of reel 20. In such embodiments, tape measure 10 includes two coil springs 40, two storage drums 42 and two output drums 44, with reel 20 located between the pair of motor spring sets. In one such embodiment, one output drum 44 is located on one side of reel 20, and the other output drum 44 is located on the other side of reel 20. In this arrangement, reel 20 is located between the two output drums 44 in the direction of rotational axis 28.

Figure 4:
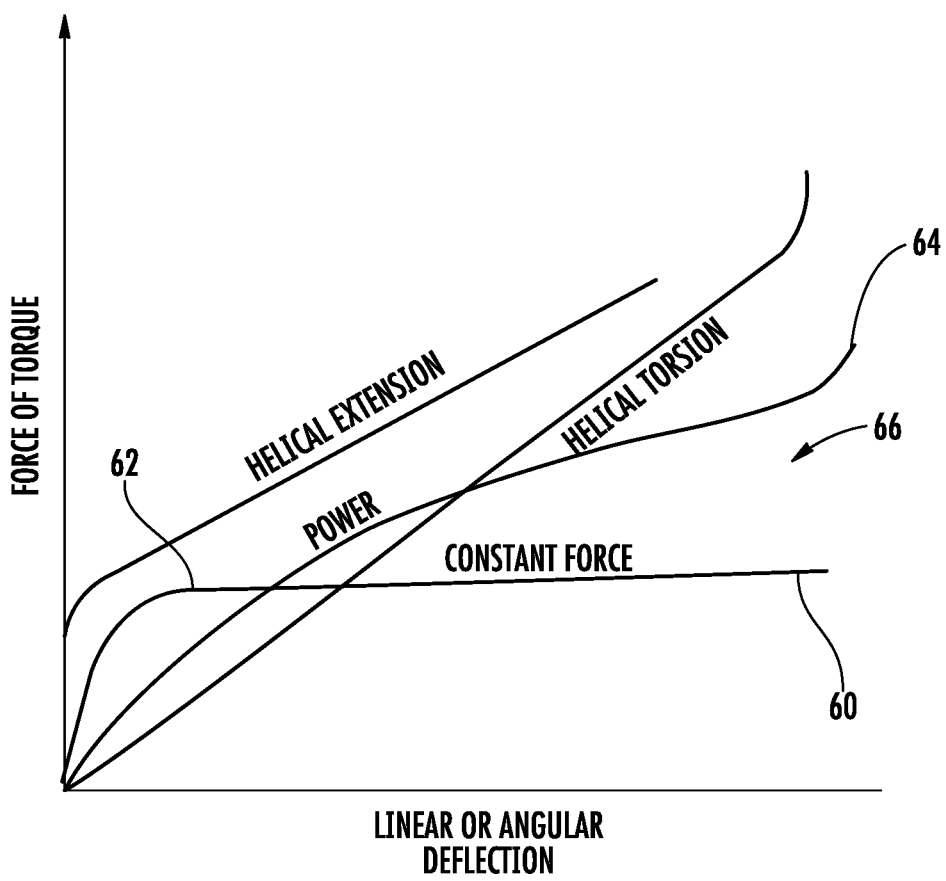
FIG. 4 is a graph of torque vs. spring deflection comparing a motor spring to a variety of other spring arrangements.

Referring to FIG. 4, the torque profile of motor spring system 26 (also called a constant force spring system or a constant torque system) relative to the spring angular deflection (e.g., number of winds around output drum 44) is shown at plot 60. As can be seen, motor spring system 26 reaches a high torque level with a relatively low angular deflection/number of winds at point 62, then delivers relative constant torque over the remaining turns of the spring. Motor spring system 26 is configured such that the torque delivered at the constant toque portion of the profile is sufficient to retract tape 18 but is low enough to prevent/reduce whip and/or prevent/reduce damage when hook assembly 22 hits housing 12 at the completion of retraction.

Further, the reduction in unneeded retraction torque provided by motor spring system 26 as compared to other potential retraction spring devices is shown in FIG. 4. In particular, power springs are a type of spring commonly used for tape retraction in tape measures, and plot 64 shows an exemplary torque profile of a typical power spring. As shown in FIG. 4, in order to deliver enough torque over a sufficiently low angular deflection range, a power spring typically must be configured to have peak levels of torque that are unnecessarily high. This unneeded torque/spring energy is represented by the area 66 between plots 60 and 64. By eliminating the unneeded torque/energy represented as area 66, motor spring system 26 decreases the amount of torque/energy that is available to generate unwanted retraction speed and potential tape blade damage.

In addition to providing the improved torque delivery shown in FIG. 4, motor spring system 26 is also configured relative to reel 20 and housing 12 to provide various functional benefits. As shown in FIG. 3, output drum 44 is positioned adjacent to reel 20 along the axis of rotation 28. In the specific embodiment of FIG. 3, the rotational axis of output drum 44 is aligned with/the same as (e.g., is collinear with) rotational axis 28, and output drum 44 rotates within reel 20 as a single body such that for each full rotation of output drum 44, reel 20 completes a full rotation.

Further, in this arrangement, spring 40 is wound on output drum 44 outside of the volume defined by reel 20 and is not surrounded by tape blade 18. By positioning output drum 44 adjacent to reel 20 (as opposed to behind or below reel 20), complexity of tape measure 10 can be reduced by eliminating the need for complex transmission systems (e.g., gears, linkages, etc.) to translate rotation of reel 20 to rotation of output drum 44. Similarly, the total length of housing 12 can be lower than a tape measure in which both storage drum 42 and output drum 44 are located behind reel 20. In addition, in contrast to typical tape measures in which the retraction spring is located inside reel 20, motor spring system 26 allows for the desired level of retraction torque to be delivered (for a given length of tape blade 18) with a reel 20 having a smaller outer diameter. This results in a tape measure 10 having a more compact housing 12 in the height dimension, as compared to tape measures that include a power spring located within reel 20.

In various embodiments, because spring 40 is not located inside of reel 20, the decrease in diameter of reel 20 may allow for tape measure 10 to utilize this space savings for other uses. For example, in one embodiment, motor spring system 26 allows for a longer tape 18 to be stored on reel 20 for a fixed size of reel 20 and housing 12. In another embodiment, motor spring system 26 allows for a thicker tape 18 to be stored on reel 20 for a fixed size of reel 20 and housing 12. In specific embodiments, the outermost height dimension of housing 12 is less than 3.25 inches and the length of tape 18 is 25 to 50 ft. In another specific embodiment, the outermost height dimension of housing 12 is less than 3.25 inches and the thickness of tape 18 is 0.1 to 0.7 mm, specifically is 0.3 to 0.6 mm and more specifically is about 0.4 mm (e.g., 0.4 mm plus or minus 10%).

As shown in FIG. 3, storage drum 42 has an axis of rotation 70. In this arrangement, axis of rotation 70 is located behind output drum 44 relative to the front of tape measure housing 12 having tape port 30. In this embodiment, the height dimension of tape housing 12 is further decreased, while increasing length to accommodate the rearward positioning of storage drum 42. In particular, this positioning of motor spring system 26 allows housing 12 to be formed in an elongated, wedge type shape as shown in FIG. 1, which Applicant believes may allow for easier and/or more comfortable grip within the user's hand. Further, in this embodiment, rotation axis 70 is coplanar with and horizontally shifted rearward from rotation axis 28 such that both axes 28 and 70 reside in a common horizontal plane.

In other contemplated embodiments, storage drum 42 and output drum 44 may be positioned in other relative orientations within housing 12. For example in some embodiments, storage drum 42 may be positioned above or below a horizontal plane intersection rotational axis 28 of storage drum 44. In some embodiments, storage drum 42 is located in front of output drum 44.

In various embodiments, the various components of motor spring system 26 are configured to generate torque between 0.5 and 3 in-lb$_f$ (inch-pounds force), specifically between 1 and 2 in-lb$_f$. In specific high torque embodiments, the various components of motor spring system 26 are configured to generate between 1.4 and 1.6 in-lb$_f$, and specifically between 1.5 and 1.6 in-lb$_f$. In specific lower torque embodiments, the various components of motor spring system 26 are configured to generate between 0.5 and 1.5 in-lb$_f$, specifically between 0.7 and 1.4 in-lb$_f$, more specifically between 0.9 and 1.3 in-lb$_f$ and even more specifically 1.1 in-lb$_f$. In various embodiments, motor spring system 26 has a number of turns, $N_{turns}$, when tape 18 is fully extended of between 40 and 70, specifically between 50 and 60 and more specifically of 55. In various embodiments, storage drum 42 has an outer diameter, $D_s$, of between 10 and 30 mm, specifically between 15 and 25 mm and more specifically of 20 mm. In various embodiments, output drum 44 has an outer diameter, $D_o$, of between 20 and 50 mm, specifically between 25 and 40 mm and more specifically of 34 mm. In various embodiments, spring 40 has a thickness, $T_s$, of between 0.05 mm and 0.2 mm, specifically between 0.1 mm and 0.15 mm and more specifically of 0.13 mm. In various embodiments, spring 40 has a width, $W_s$, of between 10 mm and 30 mm, specifically between 15 mm and 25 mm and more specifically of 19 mm. In various embodiments, spring 40 is formed from a material having a modulus of elasticity, E, of between $20 \times 10^6$ and $40 \times 10^6$ psi, and more specifically of $30 \times 10^6$ psi.

Figure 5:
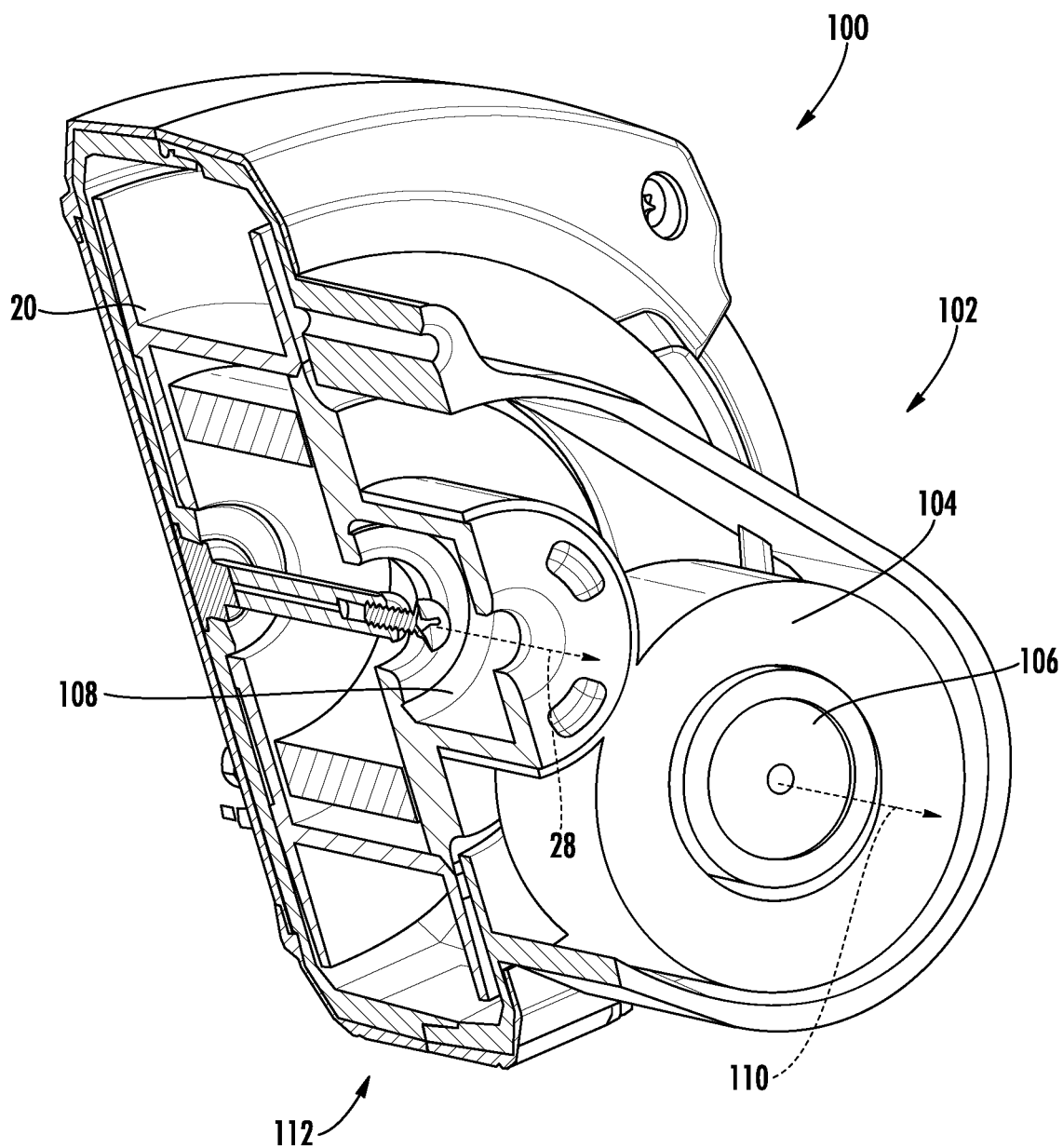
FIG. 5 is a cross-sectional perspective view of a tape measure including a motor-spring tape retraction system, according to another exemplary embodiment.

Referring to FIG. 5, a tape measure 100 is shown according to an exemplary embodiment. Tape measure 100 is substantially the same as tape measure 10 except as discussed herein. Tape measure 100 includes a spring-based retraction system, shown as motor spring system 102. Like motor spring system 26, motor spring system 102 is coupled to tape reel 20 such that the spring of motor spring system 102 is coiled or wound to store energy during extension of tape 18 and is unwound, releasing energy, driving rewinding of tape 18 onto tape reel 20 during retraction of tape 18 (e.g., following release or unlocking of the tape 18).

Motor spring system 102 includes a coil spring 104, a storage reel or drum 106 and an output reel or drum 108. However, unlike tape measure 10, storage drum 106 is positioned below output drum 108. In this arrangement, axis of rotation 110 of storage drum 106 is located below rotation axis 28 such that rotation axis 110 is located between the bottommost surface 112 of tape measure 100 and rotation axis 28 in the vertical direction. In various embodiments, this arrangement allows for tape measure 100 to have a shorter length housing than tape measure 10. Applicant also believes that the positioning of motor spring system 102 as shown in FIG. 5 results in a tape housing shape that is easy and/or comfortable for the user to hold.

FIG. 6 and FIG. 7 show another tape measure including a motor spring. In this embodiment, the motor spring is positioned inside of (e.g., surrounded by) the tape and belt arrangement, and the motor spring can be configured to drive either tape reel. In this embodiment, an end of the tape is attached to the belt. The belt may be cogged or toothed. In one embodiment, the tape includes a loop formed in the end of the tape which acts as the belt, and in such embodiments, a separate belt may not be needed. In some such embodiments, positive interaction of forces between the spring and tape is provided, e.g., through the cogged belt or tape. As shown in FIG. 6 and FIG. 7, as the reels rotate, the tape winds around the motor spring in an oval shape, with the motor spring arrangement surrounded by the oval-shaped path of the tape. The embodiment shown in FIGS. 6 and 7 provides a tape measure that decreases outer tape width by positioning the motor spring within the tape wind path.

Referring specifically to FIG. 6 and FIG. 7, a tape measure 120 is shown according to an exemplary embodiment. Similar to the other tape measure embodiments discussed herein, tape measure 120 includes a spring-based retraction system including a motor spring system 122 and a pair of tape reels 123 and 125. Similar to a motor spring system 26, motor spring system 122 is coupled to tape reels 123 and 125 such that the spring of motor spring system 122 is coiled or wound to store energy during extension of tape 18 and is unwound, releasing energy, driving the rewinding of tape 18 onto tape reels 123 and 125 during retraction of tape 18 (e.g., following release or unlocking of tape 18).

Motor spring system 122 includes a spring 124, a storage reel or drum 126 and an output reel or drum 128. Storage drum 126 is coupled to tape reel 123 such that storage drum 126 shares an axis of rotation with reel 123. In this particular embodiment, storage drum 126 is in the form of an annular component rotationally coupled to a central post 130, and central post 130 is rotationally fixed to tape reel 123. In this arrangement, storage drum 126 rotates around post 130 independent of (and in the opposite direction of) tape reel 123 during tape extension and retraction. In specific embodiments, the inner circumferential surface of storage drum 126 includes a structure, such as a bearing structure and/or lubricant, that facilitates rotation of storage drum 126 on post 130.

Motor spring system 122 includes output drum 128 located adjacent to both storage drum 126 and tape reel 123. Similar to the other motor spring embodiments discussed herein, output drum 128 has a larger diameter than storage drum 126 such that energy is stored within spring 124 during tape extension as spring 124 is wrapped around output drum 128. Output drum 128 is coupled to tape reel 125 in a fixed relation such that rotation of output drum 128 drives rotation of tape reel 125 and vice versa.

Motor spring system 122 includes a belt 132. Belt 132 has an inner surface 134 that engages outer surfaces of tape reels 123 and 125. In particular embodiments, inner surface 134 may include teeth or cogs that engage opposing structures on the outer surface of tape reels 123 and 125. In general, belt 132 is the structure that rotationally couples tape reels 123 and 125 and output drum 128 together. For example, extension of tape 18 drives belt 132 (e.g., in the clockwise direction in FIGS. 6 and 7), which in turn drives rotation of output drum 128 in the clockwise direction, which causes spring 124 to be wound on output drum 128. Similarly, when tape 18 is released, spring 124 on output drum 128 unwinds back on to storage drum 126, which in turn drives rotation of output drum 128 in the counterclockwise direction, which causes belt 132 to rotate in the counterclockwise direction, causing tape 18 to be wrapped back onto and around belt 132.

Belt 132 defines an elongate path around tape reels 123 and 125 and around output drum 128. The outer circumferential surfaces of tape reels 123 and 125 provide the curved surfaces around which tape 18 and belt 132 are wrapped. An inner end of tape 18 is coupled to belt 132, and belt 132 has an outward facing surface on to which tape 18 is wound during tape retraction. In this arrangement, tape 18 is wrapped in a non-circular or elongate path around tape reel 123 and 125 and around output drum 128. In contrast to tape measure 10 discussed above, both storage drum 126 and output drum 128 are located inside tape 18, when tape is in the retracted position.

In one embodiment, belt 132 is a component that is separate from tape 18 and tape 18 is coupled to the separate belt component 132. In another embodiment, belt 132 is formed from the inner end of tape 18 being shaped into a loop shape and coupled to reels 123 and 125 and output drum 128. In this embodiment, belt 132 is integral with and formed from the same material as tape 18. In some embodiments, the teeth shown on inner surface 134 are overmolded onto the belt structure or onto the inner end of the tape blade to provide the engagement with the teeth on the reels To accommodate the elongate wrapped shape of belt 132 and tape 18, tape measure 120 includes an elongate housing 136. Housing 136 has a pair of opposing major surfaces 138 and a pair of opposing minor surfaces 140 that are positioned in a generally perpendicular direction relative to major surfaces 138. Major surfaces 138 are joined to minor surfaces 140 by corner sections 142 that provide rounded transitions between the major and minor surfaces. Housing 136 has an opening 144 through which tape 18 is extended and retracted. In the arrangement shown in FIG. 6, opening 144 is located in one of corners 142 and defines a tape extension path that is parallel to a plane containing the rotational axes of tape reels 123 and 125, storage drum 126 and output drum 128. In this arrangement, tape 18 is extended/retracted in a direction that is parallel to major surfaces 138, which applicant believes provides a tape measure with a stable base.

In the arrangement shown in FIGS. 6 and 7, motor spring system 122 is located within both belt 132 and tape 18 (when tape 18 is in the retracted position). By positioning the components of motor spring system 122 within tape 18, Applicant believes that the width of housing 136 can be decreased, at least relative to some other designs. Further, the elongate and relatively narrow housing design may provide an easy-to-grip and/or easy-to-handle tape measure design. In specific embodiments, Applicant believes that the general, elongate shape of housing 136 may provide for a more compact and/or easy-to-handle tape measure, as compared to a design in which a motor spring system is arranged within a cylindrical tape reel.

Figure 8:
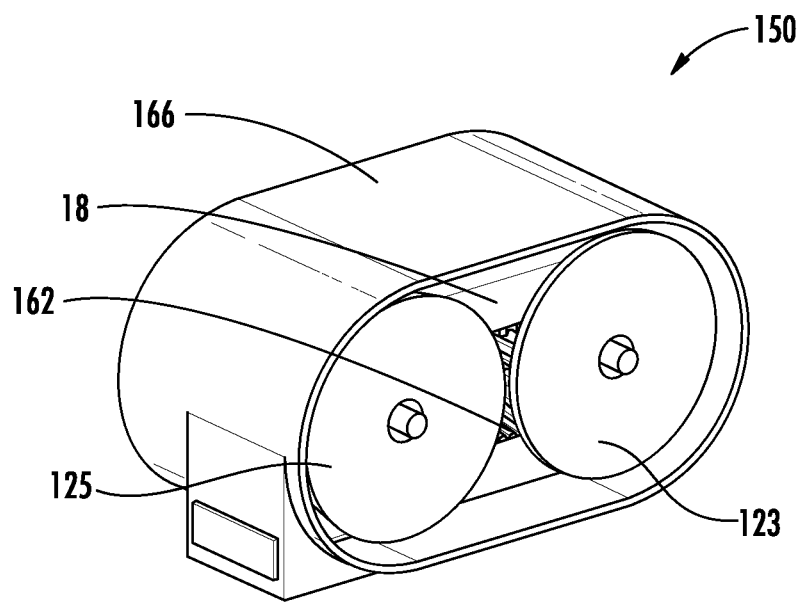
FIG. 8 shows a tape measure including a motor-spring tape retraction system, according to another exemplary embodiment.
Figure 9:
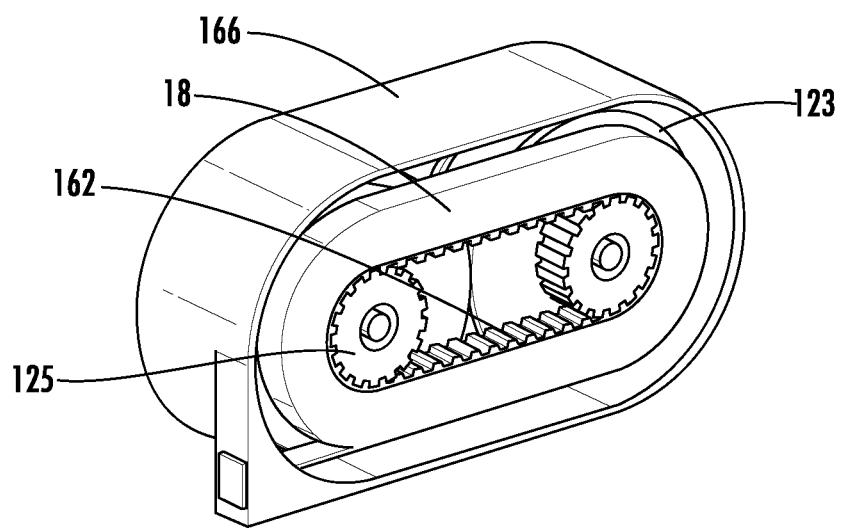
FIG. 9 shows a perspective view of the inside of the tape measure of FIG. 8 with a portion of the housing removed, according to an exemplary embodiment.
Figure 10:
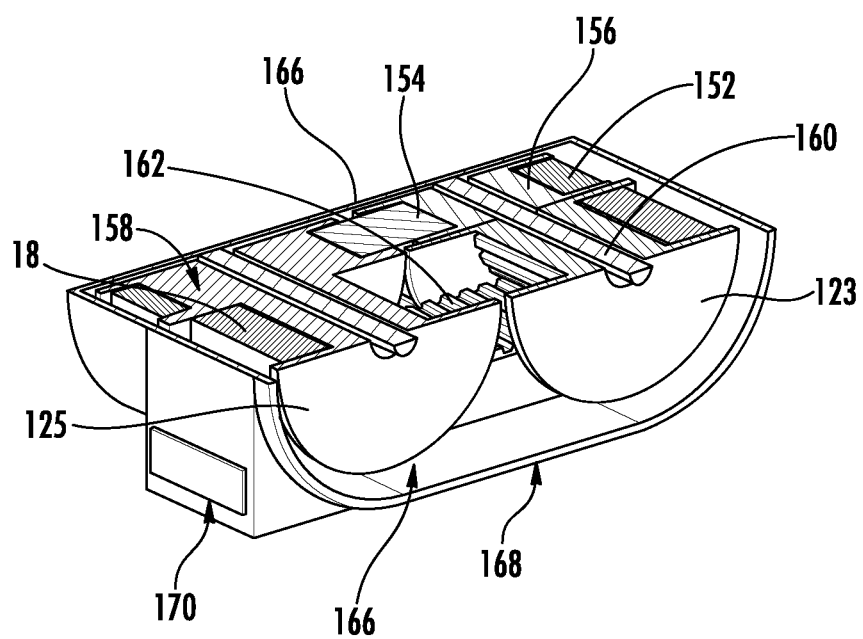
FIG. 10 shows a cross-sectional perspective view of the tape measure of FIG. 8, according to an exemplary embodiment.

FIGS. 8-10 show another tape measure including a motor spring. In this embodiment, the motor spring is positioned parallel to and outside of the tape and belt, and the motor spring can be configured to drive either tape reel. In this embodiment, an end of the tape is attached to the belt. The belt may be cogged. In one embodiment, the tape includes a loop formed in the end of the tape which acts as the belt, and in such embodiments, a separate belt may not be needed. In some such embodiments, positive interaction of forces between the spring and tape is provided, e.g., through the cogged belt or tape. As shown in FIGS. 8-10, as the reels rotate, the tape winds around them in an oval shape, with the motor spring arrangement surrounded by the oval shaped path of the tape.

Referring specifically to FIGS. 8-10, a tape measure 150 is shown according to an exemplary embodiment. Tape measure 150 is similar to tape measure 120 except as discussed herein. Similar to tape measure 120, tape measure 150 includes a spring-based retraction system, shown as motor spring system 152. Motor spring system 152 is coupled to tape reels 123 and 125 such that the spring of motor spring system 152 is coiled or wound to store energy during extension of tape 18 and is unwound, releasing energy, driving rewinding of tape 18 onto tape reels 123 and 125 during retraction of tape 18 (e.g., following release or unlocking of the tape 18).

Motor spring system 152 includes a spring 154, a storage reel or drum 156 and an output reel or drum 158. Like motor spring system 122 of tape measure 120 discussed above, storage drum 156 shares a rotational axis with tape reel 123. Output drum 158 is positioned adjacent to storage drum 156 and is coupled to reel 125 such that output drum 158 and reel 125 rotate together. However, unlike tape measure 120, both storage drum 156 and output drum 158 are located adjacent to tape reels 123 and 125 in the width direction. In this arrangement, spring 154, storage drum 156 and output drum 158 are located adjacent to tape 18 (when in the retracted position) and are not located inside tape 18 as is the case with tape measure 120.

Further as shown best in FIG. 10, storage drum 156 and tape reel 123 share a common axel 160. In this arrangement, storage drum 156 is rotatably coupled to axel 160, and reel 123 is rotatably coupled to axel 160. However, storage drum 156 is not fixed to reel 123 which allows drum 156 to rotate independent of reel 123 during tape extension and retraction.

Similar to motor spring system 122, motor spring system 152 includes a belt 162. Belt 162 is generally the same as and performs the same function as belt 132. However, storage drum 156 and output drum 158 are located adjacent to tape reels 123 and 125, and as such are also located outside of and adjacent to belt 162. In this manner, spring 154, storage drum 156 and output drum 158 are not located inside of the path of belt 132 or of tape 18. As such belt 162 and tape 18 do not surround spring 154, storage drum 156 or output drum 158 as is the case in the motor spring arrangement of tape measure 120. In this arrangement, spring 154, storage drum 156 or output drum 158 are located adjacent to belt 162 and tape 18 in the width direction.

Tape measure 150 includes a housing 166 that surrounds and houses the components of tape measure 150. Similar to housing 136 of tape measure 120, housing 166 has an elongate shape. However, by positioning the components of motor spring system 152 adjacent to but outside of tape 18 and belt 162, Applicant believes that the height of housing 166 can be decreased, at least relative to some other designs (e.g., tape measure 120). To accommodate the positioning of motor spring system 152, housing 166 has a width that is larger than the width of tape measure 120, as discussed above. For at least some users, Applicant believes that the shape of housing 166 may provide a more comfortable grip. In addition, the width of housing 166 provides a wide, stable base surface 168, which may be desirable for at least some tape measure uses.

In the embodiment shown in FIGS. 8-10, an opening 170 for tape 18 is located to one side of housing 166. In this arrangement, motor spring system 152 is located on one side of tape 18.

However, in another embodiment, tape measure 150 may include a pair of motor spring systems, one located on each side of the tape and tape reel. In such embodiments, tape reels 123 and 125, tape 18 and belt 162 are located in between the pair of motor spring systems 152.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more components or elements, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
    a housing comprising a tape blade opening;
    a tape reel rotatably mounted within the housing defining an axis of rotation, the tape reel comprising a radially outward facing surface;
    an elongate tape blade wound around the radially outward facing surface of the tape reel; and
    a spring-based retraction system comprising:
        a storage drum;
        an output drum coupled to the tape reel and located outside of and adjacent to the tape reel in a direction along the axis of rotation of the tape reel; and
        a spring coupled at a first end to the storage drum and at a second end to the output drum;
        wherein, when the tape blade is extended from the tape blade opening, the spring is unwound from the storage drum and wound around the output drum storing energy within the spring;
        wherein, during tape blade retraction, the spring is unwound from the output drum and wound around the storage drum releasing energy driving winding of the tape blade on to the reel.

2. The tape measure of claim 1, wherein an axis of rotation of the output drum is collinear with the axis of rotation of the tape reel and further wherein the output drum is rigidly connected to the tape reel such that the output reel and the tape reel rotate together during tape blade extension and retraction.

3. The tape measure of claim 2, wherein the tape housing defines a longitudinal axis, wherein the axis of rotation of the tape reel is located between the tape blade opening and the storage drum in the direction of the longitudinal axis.

4. The tape measure of claim 1, wherein an outer diameter of the output drum measured at a circumferential surface around which the spring is wound is greater than an outer diameter of the storage drum measured at a circumferential surface around which the spring is wound.

5. The tape measure of claim 4, wherein a diameter of the tape reel measured at the radially outward facing surface is greater than the outer diameters of both the output drum and the storage drum.

6. The tape measure of claim 1, wherein no portion of the spring of the spring-based retraction system is located within the tape reel.

7. The tape measure of claim 1, wherein an outermost height dimension of the housing is less than 3.25 inches and a length of the tape blade is 25 ft. to 50 ft.

8. The tape measure of claim 7, wherein the spring-based retraction system generates torque of between 0.5 and 3 inch-pounds force.

9. The tape measure of claim 8, wherein the spring has a thickness between 0.05 mm and 0.2 mm.

10. The tape measure of claim 1, wherein the output drum is configured to rotate in a first direction during tape retraction and the storage drum is configured to rotate in a second direction, opposite the first direction, during tape retraction.

11. The tape measure of claim 1, wherein the elongate tape blade has an upper surface with a concave profile when extended from the housing and a hook assembly coupled to an outer end of the elongate tape blade.

12. A tape measure comprising:
a housing;
a tape reel rotatably mounted within the housing defining an axis of rotation, the tape reel comprising a radially outward facing surface;
an elongate tape blade wound around the radially outward facing surface of the tape reel; and
a spring-based retraction system comprising:
a storage drum;
an output drum coupled to the tape reel, wherein an axis of rotation of the output drum is collinear with the axis of rotation of the tape reel;
a spring coupled at a first end to the storage drum and at a second end to the output drum;
wherein, when the tape blade is extended from the housing, the spring is unwound from the storage drum and wound around the output drum storing energy within the spring;
wherein, during tape blade retraction, the spring is unwound from the output drum and wound around the storage drum releasing energy driving winding of the tape blade on to the reel.

13. The tape measure of claim 12, wherein the output drum is rigidly connected to the tape reel such that the output reel and tape reel rotate together during tape blade extension and retraction.

14. The tape measure of claim 12, wherein the output drum is configured to rotate in a first direction during tape retraction and the storage drum is configured to rotate in a second direction, opposite the first direction, during tape retraction.

15. The tape measure of claim 12, wherein the elongate tape blade has an upper surface with a concave profile when extended from the housing and a hook assembly coupled to an outer end of the elongate tape blade.

16. The tape measure of claim 12, wherein an outer diameter of the output drum measured at a circumferential surface around which the spring is wound is greater than an outer diameter of the storage drum measured at a circumferential surface around which the spring is wound.

17. The tape measure of claim 16, wherein a diameter of the tape reel measured at the radially outward facing surface is greater than the outer diameters of both the output drum and the storage drum.

18. The tape measure of claim 12, wherein no portion of the spring of the spring-based retraction system is located within the tape reel, wherein an outermost height dimension of the housing is less than 3.25 inches and a length of the tape blade is 25 ft. to 50 ft., wherein the spring-based retraction system generates torque of between 0.5 and 3 inch-pounds force, wherein the spring has a thickness between 0.05 mm and 0.2 mm.

19. A tape measure comprising:
a housing;
a tape reel rotatably mounted within the housing defining an axis of rotation, the tape reel comprising a radially outward facing surface;
an elongate tape blade wound around the radially outward facing surface of the tape reel;
a motor spring retraction system located within the housing and coupled to the tape reel, the motor spring retraction system comprising:
a storage drum;
an output drum;
a spring coupled at a first end to the storage drum and at a second end to the output drum;
wherein, when the tape blade is extended from the housing, the spring is unwound from the storage drum and wound around the output drum storing energy within the spring;
wherein, during tape blade retraction, the spring is unwound from the output drum and wound around the storage drum releasing energy driving winding of the tape blade on to the reel;
wherein the spring-based retraction system generates torque of between 0.5 and 3 inch-pounds force.

20. The tape measure of claim 19, wherein an outermost height dimension of the housing is less than 3.25 inches and a length of the tape blade is 25 ft. to 50 ft., wherein the spring has a thickness between 0.05 mm and 0.2 mm.

* * * * *